(12) United States Patent
Breuer et al.

(10) Patent No.: US 10,993,170 B2
(45) Date of Patent: Apr. 27, 2021

(54) METHOD FOR OPERATING A WIRELESS DEVICE IN A CELLULAR NETWORK

(71) Applicant: GEMALTO M2M GmbH, Munich (DE)

(72) Inventors: Volker Breuer, Boetzow (DE); Florian Denzin, Berlin (DE); Uwe Dummann, Panketal (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/091,698

(22) PCT Filed: Apr. 5, 2017

(86) PCT No.: PCT/EP2017/058071
§ 371 (c)(1),
(2) Date: Oct. 5, 2018

(87) PCT Pub. No.: WO2017/174635
PCT Pub. Date: Oct. 12, 2017

(65) Prior Publication Data
US 2019/0166544 A1    May 30, 2019

(30) Foreign Application Priority Data
Apr. 8, 2016    (EP) .................................. 16164477

(51) Int. Cl.
*H04W 48/06*    (2009.01)
*H04W 48/12*    (2009.01)
(Continued)

(52) U.S. Cl.
CPC ......... *H04W 48/06* (2013.01); *H04L 12/1489* (2013.01); *H04W 4/70* (2018.02);
(Continued)

(58) Field of Classification Search
CPC .......... H04L 12/1489; H04L 12/1886; H04W 28/02; H04W 28/10; H04W 36/14;
(Continued)

(56) References Cited

U.S. PATENT DOCUMENTS

| 2012/0040643 A1 | 2/2012 | Diachina et al. |
| 2013/0272119 A1 | 10/2013 | Jang et al. |

(Continued)

FOREIGN PATENT DOCUMENTS

| CA | 2844411 A1 | 2/2013 |
| CN | 101742453 A | 6/2010 |

(Continued)

OTHER PUBLICATIONS

Alcatel-Lucent, Alcatel-Lucent Shangai Bell, "Coverage Enhancement Targets", Coverage Enhancement Targets, V02, 3GPP TSG RAN WG1 Meeting #79, San Francisco, USA, Retrieved from the Internet: URL:http://www.3gpp.org/ftp/Meetings_3GPP_SYNC/RAN1/Docs/, Nov. 17, 2017. R1-144695, XP050875778.

(Continued)

*Primary Examiner* — Kan Yuen
(74) *Attorney, Agent, or Firm* — Buchanan Ingersoll & Rooney PC

(57) ABSTRACT

The present invention relates to a method for operating a wireless device in a cellular network, the wireless device operating with a base node of the cellular network, the method comprises upon noticing a barring indication received from the base node at the wireless device the step of suppressing access to the base node under the conditions: the wireless device is operating in an intensive use mode and the wireless device is operating in a non-privileged service.

20 Claims, 2 Drawing Sheets

(51) Int. Cl.
*H04W 4/70* (2018.01)
*H04L 12/14* (2006.01)
*H04W 36/14* (2009.01)
*H04W 48/16* (2009.01)

(52) U.S. Cl.
CPC ........... *H04W 36/14* (2013.01); *H04W 48/12* (2013.01); *H04W 48/16* (2013.01)

(58) Field of Classification Search
CPC ..... H04W 48/06; H04W 48/12; H04W 48/16; H04W 4/70; H04W 48/02
See application file for complete search history.

(56) References Cited

U.S. PATENT DOCUMENTS

| | | | |
|---|---|---|---|
| 2016/0057646 A1* | 2/2016 | Liberg | H04W 28/0205 370/230 |
| 2017/0135025 A1* | 5/2017 | Koskinen | H04W 48/02 |

FOREIGN PATENT DOCUMENTS

| | | |
|---|---|---|
| CN | 106576283 A | 4/2017 |
| WO | 2015066645 A1 | 5/2015 |

OTHER PUBLICATIONS

International Search Report (PCT/ISA/210) dated May 11, 2017, by the European Patent Office as the International Searching Authority for International Application No. PCT/EP2017/058071.

Written Opinion (PCT/ISA/237) dated May 11, 2017, by the European Patent Office as the International Searching Authority for International Application No. PCT/EP2017/058071.

Office Action (First Office Action) dated Aug. 5, 2020, by the China National Intellectual Property Administration in corresponding Chinese Patent Application No. 201780022325.1 (15 pages).

Office Action dated May 11, 2020, by the Canadian Intellectual Property Office in corresponding Canadian Patent Application No. 3,018,810. (5 pages).

* cited by examiner

METHOD FOR OPERATING A WIRELESS DEVICE IN A CELLULAR NETWORK

FIELD OF THE INVENTION

The present invention relates to a method for operating a wireless device in a cellular network. The invention also pertains to a wireless device using said method. The invention further relates to a cellular network for wireless communication.

BACKGROUND OF THE INVENTION

As part of recent developments in wireless cellular communication a new category of wireless devices was introduced besides the existing mobile handsets. This new category encompasses machine type communication (MTC) devices. It is expected that the number of machine type communication devices operating in cellular networks will—at least in certain regions—clearly exceed the numbers of mobile handsets.

Consequently for the cellular networks methods were developed that allow to cope with this expected increased, in particular having in mind certain characteristics for traffic, e.g. machine type communication, notably stationary behavior or rarely but periodically data transmission mainly in one direction, data-only communication or delay tolerant communication scheme etc.

Part of these developments are in particular incorporated in developments of long term evolution (LTE) standard, in particular LTE-MTC, resp. LTE-category 0 or 1.

One part of this development is the so-called extended access barring (EAB) resp. access class barring (ACB), which allows cellular networks for certain base nodes resp. eNodeBs in overload situation to disallow devices based on their traffic class to access the base nodes or at least to allocate resources of the cellular network. Such traffic classes in particular relate to bandwidth reduced devices and/or such devices operating in enhanced coverage.

With EAB functionality the cellular networks have means to assure the stability of their networks, at least as ultima ratio.

The concept of access barring comprises that for all wireless devices the affected base node is not accessible. This all-or-nothing concept is adopted for access class barring to only affect those wireless devices of a certain access class, and thus that are envisaged to decode the M-SIBs, where the "cellBarred" flag is set.

However, such all-or-nothing concept is disadvantageous as it leads to barring all machine type communication devices from cellular network access. With that all machine type communication devices are handled equally irrespective of the usage intensity, the purpose of the wireless devices' communication or the type of wireless device.

It is therefore the goal of present invention to overcome the mentioned disadvantages and to propose a solution for an improved access barring concept which takes into account both the needs of the cellular network and the affected wireless devices.

Further alternative and advantageous solutions would, accordingly, be desirable in the art.

SUMMARY OF THE INVENTION

For this it is according to a first aspect of the invention suggested a method for operating a wireless device according to claim 1. It is further suggested according to a second aspect of the invention a wireless device according to claim 10. It is further proposed according to a third aspect of the invention a cellular network according to claim 15.

According to the first aspect of the invention it is proposed a method for operating a wireless device in a cellular network, the wireless device operating with a base node of the cellular network, the method comprises upon noticing a barring indication received from the base node at the wireless device the step of suppressing access to the base node under the conditions:
- the wireless device is operating in an intensive use mode and
- the wireless device is operating in a non-privileged service.

The invention relates to a wireless device operating in a cellular network for wireless communication. The wireless device is generally any kind of device comprising at least a communication unit, an antenna for accessing the wireless air interface to the serving base node, a control processing unit and a subscriber identity unit. The serving base node is one of a plurality of base nodes belonging to the cellular network. It is the base node the wireless device is camping on.

The base node is the entry point of the cellular network to the air interface. Depending upon the supported technology, like 2G (GSM, GPRS, EDGE), 3G (UMTS, HSPA), 4G (LTE, LTE-Catx, LTE-M) the base node is implemented in particular as a base station (BS), nodeB, eNodeB.

In course of operating in the cellular network the wireless device is periodically decoding broadcast channels transmitted from the serving base node. As part of the broadcast channels typically system information are submitted. Those system information are preferably arranged in so called system information blocks (SIBs).

It is defined in the relevant technology standard that in the service information at least one field for providing a barring indication is foreseen. This barring indication field—typically known as the "cellBarred" flag—is according to known standards a binary field which indicates that all wireless devices camping on the base node, are blocked from launching a data transmission session on the serving base node.

This relates in particular to those wireless devices to which this SIBs are addressed to receive service information. According to recent developments there are foreseen for certain types of wireless devices dedicated SIBs. This applies in particular to machine type communication devices, for that the so-called M-SIBs are defined.

With that the network operator has the chance to restrict the access for only that type of wireless device. This is useful as there is expected a multitude of machine type communication devices with comparably low and non-momentary traffic requirements, hence low priority devices compared to mobile handsets operated by persons.

Additionally a barring may be depending on the traffic class of a wireless device. With that only those wireless devices operating in a certain traffic class would barred from accessing the cellular network, while others e.g. handsets making normal calls are not barred.

Preferably it is foreseen to amend the barring indication that way that the barring is supposed to affect only those wireless devices which are currently operating in an intensive use mode.

Preferably this is achieved by an additional field in the M-SIB indicating this situation, or enhancing the existing barring indication field by another dimension.

The intensive use mode is a mode which utilize a high amount of the available resources of the base node. This is in particular the case for wireless devices where the balance between payload data and overhead data is moved towards the latter. In that case a lot of resources are used, but without a consideration in return.

This improvement is advantageous as it affects only those wireless devices that are operating in a way that uses a lot of resources resp. power but nevertheless earn a low priority.

In a preferred embodiment the intensive use mode comprises operating in enhanced coverage mode.

With that advantageous embodiment wireless devices in bad reception conditions are concerned. The enhanced coverage mode was defined as part of the 3GPP Release 13 definition in particular for MTC devices. This enhanced coverage (EC) mode solves said reception issues by allowing communication that way that by many repetitive receptions the same data packets are sufficiently often combined by the receiver until the data packets can be reliably decoded from the receiver. Typically this is done for wireless devices operated e.g. in basements of buildings, like for metering devices.

The necessity to repeat the transmission of each data packet leads to a high usage of resources at the base node. Hence a wireless device operating in enhanced coverage mode is an intensive use mode wireless device.

The same applies to extended coverage mode as defined for 2G technology standard.

Other intensive use modes further relate to sidelink/relay devices, which are defined for device-to-device (D2D) communication. Such relay devices operate as aggregator for other wireless devices which have no or limited access to the base node directly. Hence the relay devices have a comparably high resource usage.

Further intensive use mode use cases can happen in case that a coding rate above a certain level would be needed to overcome momentary interference on the air interface. With that it appears that i.e. due to the high coding rate the number of bits transported becomes very high whilst the transported payload stays small.

Hence, various options for an intensive use mode are encompassed by present inventive method.

The wireless device is consequently receiving the barring indication as part of the received broadcast signals and further identifies if it applies to the wireless device. This can only be the case when the wireless device itself is operating in an intensive use mode, in particular in enhanced coverage mode.

But that is not the only precondition for being barred. As the operation in an intensive use mode tells nothing about the kind of operation of the wireless device, it is not sufficient to rely only on the usage mode criterion in order to identify the wireless devices that need to be barred in case of a congested base node.

Additionally as part of the inventive method it is considered the type of service the wireless device is currently operating in. Hence, when the wireless device detects a barring indication for an intensive use mode, where the wireless device is operating in, then it in particular further identifies the service it is currently operating.

The wireless device only suppresses further access to the base node, when it is operating in a non-privileged service.

Preferably the non-privileged service is a service which is not a privileged service.

A privileged service is a service which has assigned a higher priority, like an emergency services or other services which have assigned a high importance in particular in terms of timeliness.

In case of absence of such indication the used service is assumed a non-privileged service. Consequently only in this case the access to the base node is suppressed and the barring becomes effective for the respective wireless device.

This additional parameter is advantageous as it allows to discriminate such wireless devices which might block a lot of resources, but without affecting the—most likely low share of—wireless devices operating in a service with a high priority.

It is further advantageous that with this additional criterion the decision if a wireless device is affected by a barring situation or not is dynamically taken. Depending on the launched or planned service the wireless device could in the same situation with the same barred traffic class and intensive use mode be barred or not.

In another preferred embodiment it is proposed that the intensive use mode includes a plurality of intensive use levels, and said conditions for suppressing access further comprising:

the wireless device is operating at least in the intensive use level indicated with the barring signal.

This embodiment is based on the additional option that the intensive use mode might have different levels of use. Due to that intensive use levels are defined. Depending upon the implementation such levels might with increasing levelnumber indicate an increasing intensity of use of cellular network resources.

In any case, at least two different levels of intensive use levels are distinguished, and with the barring indication the wireless device gets an indication to what intensive use level the barring is addressed. Preferably with the barring indication the intensive use level is transmitted in an additional field of the SIBs resp. M-SIBs.

In case there are three intensive use levels from 1 to 3, with 3 indicating the highest intensity of use the wireless device is behaving as follows:

When the barring indication depicts intensive use level 2, then the wireless device is considering barring—depending upon the operated service, of course—in that case as it is operating in intensive use level 2 or 3.

When the barring indication depicts intensive use level 3, only wireless devices operating in intensive use level 3 consider the barring.

When the barring indication depicts intensive use level 1, then all wireless devices operating in intensive use mode are addressed and consider the barring.

In conjunction with intensive use mode relating to enhanced coverage the intensive use level preferably relates to the necessary estimated repetitions in enhanced coverage mode.

With this preferred embodiment the increased resource usage of the enhanced coverage mode is reflected. It needs to be defined up to what number of estimated repetitions which intensive use level is defined. Preferably enhanced coverage levels are defined, and those enhanced coverage levels relate to the intensive use levels.

Consequently with increasing number of repetitions for reliably decoding the received signals the use of base node's resources is increased. A matching of intensive use level indicated by the barring indication and enhanced coverage level simplifies the interaction and allows fine-tuned barring indication for the most resource exhausting wireless devices.

In particular in current 3GPP specifications the enhanced coverage level is supposed to be distinguished into CE-mode A and CE-mode B, or into any finer granularity separating the entire enhanced coverage support in more than two different CE levels. Such foreseen classification is preferably also applied to this embodiment.

This is in particular advantageous as it does not require to maintain different classification. Further the classification into intensive use level simplifies for the interaction of base node and wireless device the distinction which wireless devices are to be barred. Finally this also reduces the amount of bits for the barring indication in the SIB.

With respect to the privileged resp. non-privilege service it is further proposed according to another preferred embodiment that the privileged service comprises execution of a communication session at least in a predetermined communication access class.

With the communication access class the wireless device has in particular the opportunity to easily identify the priority of the service the wireless device is currently operating in or is about to launch.

It is preferably predefined a set of certain communication access classes that is considered as non-privileged services and/or a set that is considered as privileged services.

With that the wireless device is able to easily determine in case of a barring indication, if it needs to suppress the access to the cellular network or not.

It is further advantageous to assign a further indication concerning the priority resp. communication access class of the privileged communication. Hence an indication which privileged communication is not barred or which is barred nevertheless would further allow finer means for controlling traffic in a cell.

Preferably such privileged communication access classes comprises at least one of:
  emergency communication,
  alarm communication,
  exceptional communication, and
  delay critical communication.

The emergency communication in particular relates to emergency calls, in particular those defined in ETSI TS 22.011.

Further alarm communication and exceptional communication would be considered as privileged. For that certain type of services need to have assigned priority discrimination classes, which in particular comprise alarm and/or exceptional communication classes.

In addition also delayed critical communication is preferably considered as privileged service. This is advantageous as due to its nature a continuous/periodic information flow is needed for such communication. Environmental control sensors for regulating systems may have such demands on the connectivity.

With such a service decision the wireless device consequently is in the position to easily detect if it is concerned by a barring indication or not.

According to another preferred embodiment it is further proposed that the privileged service comprises at least one of:
  operating in a predetermined cellular network tariff, or
  relating to a privileged type of wireless device.

Those privileged services are supposed to be more stable and independent of the type of communication of the wireless device with the base node.

According to that a certain used tariff indicates that this is a wireless device operating as a high priority device. This is advantageous as this assures that through a barring operation wireless devices which service usage gets paid more than from others are not barred. This is in particular true for car entertainment systems which further allow emergency calls etc.

Here additionally a combination of stable and communication type dependent service priority is foreseen and covered as part of the invention.

It is to be noted that the tariff does not necessarily has to stay constant. In particular a tariff which is at certain times much more expensive than at others is foreseen. Hence, the wireless device would in the expensive time window only carry out data transmission sessions, when it is very important. Hence this embodiment covers that situation in a simple and reliable way.

Further tariff information might change through remote signalling, in particular via bearer independent protocol to the subscriber identity module (SIM) connected to the wireless device. For such dynamic update it is proposed to check in case of each received barring indication if the current tariff is in the range of a privileged service or not.

Alternatively the kind of wireless device indicates if it is a privileged or non-privileged service. For that the wireless device needs to store internally an indication about that device type.

One way to store such an indication is as part of the subscriber identity unit, in particular SIM or UICC. With accessing this subscriber identity unit, that wireless device is able to figure out the device type.

This embodiment is advantageous as alarm panels for a Home Security System are much more dependent on reliably connectivity even in times of high congestion than an electricity metering device.

In such situations the kind of operation would not necessarily indicate the priority of the service.

According to the second aspect of the invention it is proposed a wireless device operating with a base node of a cellular network, the wireless device being configured to suppress upon noticing a barring indication received from the base node access to the base node under the conditions:
  the wireless device is operating in an intensive use mode and
  the wireless device is operating in a non-privileged service.

The second aspect shares the advantages of the first aspect.

In a third aspect of the invention it is suggested cellular network for wireless communication, configured to detect congestion in a coverage area of the cellular network comprising at least one cell area of a base node being part of the cellular network, and configured in response to said detection, to broadcast in said coverage area a signal indicating barring of wireless devices operating in an intensive use mode in a predetermined intensive use level identified within the broadcast, and to allow access for such wireless devices if operating in a privileged service.

This aspect of the invention relates to the cellular network, comprising a plurality of base nodes. That cellular network is configured to handle congestion situations and to take appropriate measures. This in particular applies to the situation that wireless devices according to the second aspect of the invention are operating in the cellular network.

For that the cellular network is configured to detect congestion in a coverage area, in particular a cell area of a base node. This is preferably the case by determining the amount of used resources of the base node. Typically an early warning threshold is defined, when a certain amount of resource usage is reached.

Many methods are known in the art for a cellular network resp. a base node or other components of the cellular network to detect a congestion situation.

In case such a situation is detected, the cellular network is configured to take measures by providing a barring indication within a broadcast to the wireless devices operating with the base node.

Such barring indication is addressed only to those wireless devices operating in a certain intensive use level.

This is preferably sufficient as the wireless devices exhausting a remarkable share of base node's resources would then be barred from accessing the base node.

But this barring exceptionally does not apply to wireless devices operating in a privileged service. Hence for those wireless devices the access is not barred.

Preferably the cellular network provides the barring indication with an indication of the barred intensive use level.

Additionally it preferably comprises an indication about at least one privileged service resp. the at least one corresponding communication class that is not barred resp. for non-privileged services which is only barred.

According to a preferred embodiment of this aspect of the invention it is proposed that the predetermination of the intensive use level considers the congestion level of said coverage area.

This embodiment indicates that in particular the intensive use level that is indicated for barring is chosen in response to the amount of congestion. With that the cellular networks has means to fine tune the barring.

In particular in a first step only the highest intensive use level is barred. It then turns out to which extent the congestion is mitigated by the barring indication.

If that is not sufficient, in particular when only a few wireless devices are operating in this level, then the next intensive use level is additionally barred. This is repeated until an acceptable congestion level is reached.

This iterative method is further able to cope with the situation of a fairly large number of wireless devices operating in a privileged service plus operating in a high intensive use level. In this case the barring of the high intensive use level would most probably not lead to a remarkable reduction of the congestion.

Hence in the second step the next lower intensive use level is additionally barred. Typically this will affect more wireless devices and increase the chance to reduce the congestion under a critical threshold. In this case still wireless devices either operating in a lower intensive use mode or no intensive use mode plus those wireless devices operating in a privileged service could continue to operate with the respective base node.

As it is shown this invention advantageously solves the depicted problem and allows for the cellular network to maintain stability and connectivity for the majority of wireless devices, by fine-grained means of barring wireless devices. This is shown to be advantageous compared to known all-or-nothing solutions, which in the end do not provide connectivity for anyone, including wireless devices which merely use any resources of the base node.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 shows in a flow chart a preferred embodiment of present invention. It is considering a wireless device resp. user equipment (UE) according to the invention. This wireless device is configured to operate with a cellular network, supporting standard technology, like 2G (GSM, GPRS, EDGE), 3G (UMTS, HSPA), 4G (LTE, LTE-Catx, LTE-M).

Figure 1:
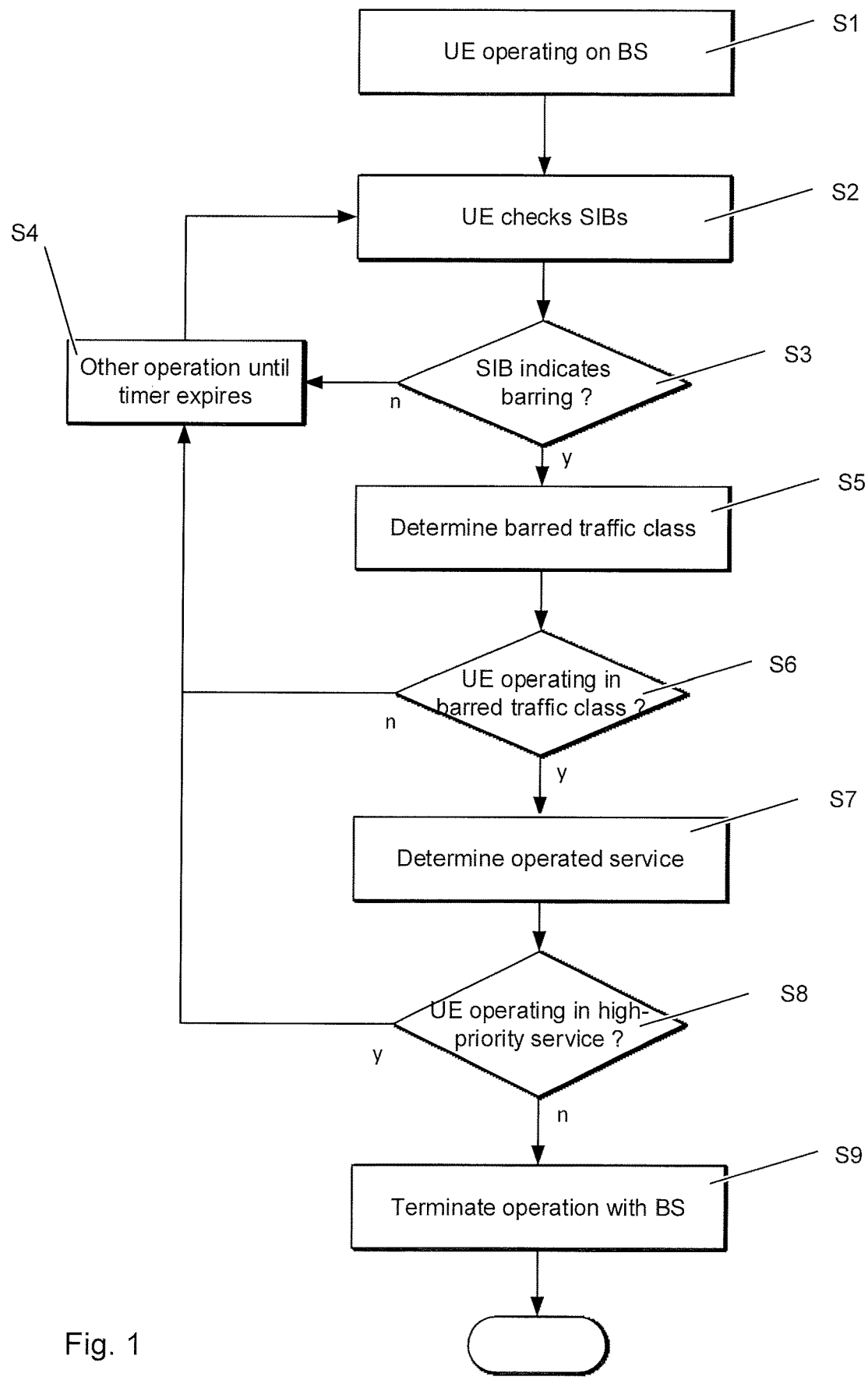
FIG. 1 represents a flow chart indicating a preferred embodiment of the present invention.

For that it is in step S1 camping on a base node (BS). This base node is implemented in particular as a base station (BS), nodeB, eNodeB, depending on the supported technology standard of the cellular network resp. radio access network. The base node the wireless device is currently camping on is called the serving base node.

The wireless device is in particular a machine-type communication (MTC) device. Such MTC devices are those wireless devices that are foreseen to allow communication between machines, typically for data transmissions.

This includes metering devices that regularly send measured data to a remote server. Another example are home security devices that are supposed to send a message to a remote service centre in the event of an emergency. Presently exemplifying embodiment is of course not limited to those exemplary device types.

As part of the general operation, the wireless device is regularly checking the system information broadcast received from the serving base node, as indicated for step S2. This system information broadcast is typically provided as part of the broadcast channel (BCCH). It contains a set of system information blocks (SIBs).

Depending upon the implementation it is in particular foreseen, that for a special group of wireless devices, in particular MTC devices, dedicated SIBs, the so-called M-SIBs are defined. In that case it is sufficient for the inventive method to only check the M-SIBs.

The regular checking is happening either in a time wise cycle or event triggered, or a combination of both. Preferably the wireless device checks the SIBs once during the predefined broadcast channel modification period. It is in particular preferable in preparation of a data transmission session to check at least a subset of the SIBs, in particular the BCCH value tag in order to realize if a change has happened in the SIBs since the last check. Any change in the SIBs, including a change of the cellBarred field, would lead to an increment of the BCCH value tag. Hence, when the BCCH value tag did not change since a previous check, where no barring indication was active, then the wireless device knows that no barring indication is now active.

With the cellBarred field the base node indicates to the wireless devices or at least the MTC devices that for the base node barring is activated for operating with this base node. Hence this needs to be checked at least prior to a data transmission session.

It is therefore as part of the inventive method checked in S3, if the SIBs indicate a barring situation for such group of wireless devices, the respective wireless device is belonging to.

If this is not the case the operation branches for normal operation to step S4. Here the wireless device is doing normal operation like sending or receiving data or just waiting until the next time for checking the SIBs.

If a barring indication is found, the process flow branches along the Yes-branch to step S5.

As the inventive method is based on an improved barring indication scheme, it is not supposed to simply bar access for all wireless devices on the cell, or at least all MTC devices. Instead, the barring indication comprises an information regarding a barred traffic class.

With that traffic class it is according to this preferred embodiment of the invention defined a barring in dependency of the resource usage of the base node with respect to an intensive use mode. This traffic class in particular relates to wireless devices operating in enhanced coverage mode.

Hence, when in step S5 it is indicated through the barring indication that wireless devices operating in enhanced coverage would be barred, then in step S6 the wireless device actually operating in enhanced coverage would branch to step S7. Otherwise it is definitely not affected by the barring indication and can continue operating with step S4.

Alternatively the barred traffic class does not only relate to the question if the wireless device is operating in enhanced coverage but also in what enhanced coverage level. This reflects the situation that a wireless device operating in deep coverage might need a multitude of repetitions in order to reliably decode the signals from the base node compared with other wireless devices in much better reception conditions, but still operating in enhanced coverage. The resource allocation for the wireless device operating in deep coverage is comparably higher than that of the latter wireless device, hence it is advantageous to first bar those deep coverage devices.

Preferably the traffic class relates to enhanced coverage levels. Such levels are preferably defined based on the number of estimated repetitions needed for reliably decoding the signals. Hence with the barring indication relating to one or more traffic classes this directly depicts wireless devices operating in enhance coverage levels.

Therefore the wireless device checks in step S6 if it is operating in the depicted enhanced coverage level.

According to the inventive method with these checks it is still not determined if the respective wireless device is barred from accessing the base node based on the received barring indication, even if in step S6 it is found that the wireless device is operating in the traffic class indicated in the barring indication.

For figuring out if it is barred, the wireless device additionally determines in step S7, what service it is currently or supposed to be operating. For the decision of step S8 it is foreseen to determine if the wireless device is operating in a privileged service. Such privileged service is in particular a high-priority service like emergency communication launched by an alarm panel. For that priority discrimination classes are preferably defined.

Alternatively or additionally the priority-class of privileged services that are not supposed to be barred is further indicated in the SIB, preferably along with the barring indication.

If the envisages service is belonging to such a high-priority class then in step S8 it is determined that the barring indication does not affect this wireless device. Instead it is supposed to continue operation in step S4.

Such privileged service alternatively may also relate to the type of wireless device and/or the currently active tariff for data operations.

In any case, when in step S8 it is not figured out that the wireless device is operating in a high-priority service, then the process flow branches to step S9. With that the wireless device terminates operating with the current serving base node. Such termination in particular includes that the wireless device needs to stop camping on the base node and therefore would be forced to carry out a cell reselection.

In alternative cases it is sufficient to only terminate and suppress any data transmission session.

Figure 2B:
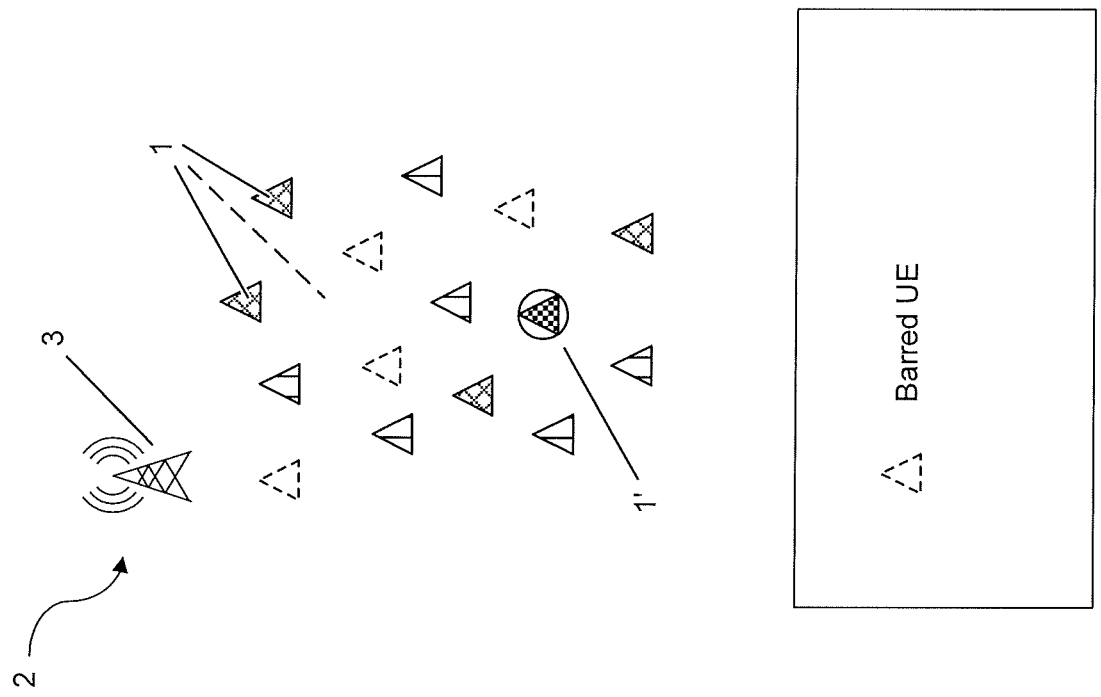
FIGS. 2a+2b show a behavior of wireless devices according to an embodiment of present invention in case of barring indication.
Figure 2A:
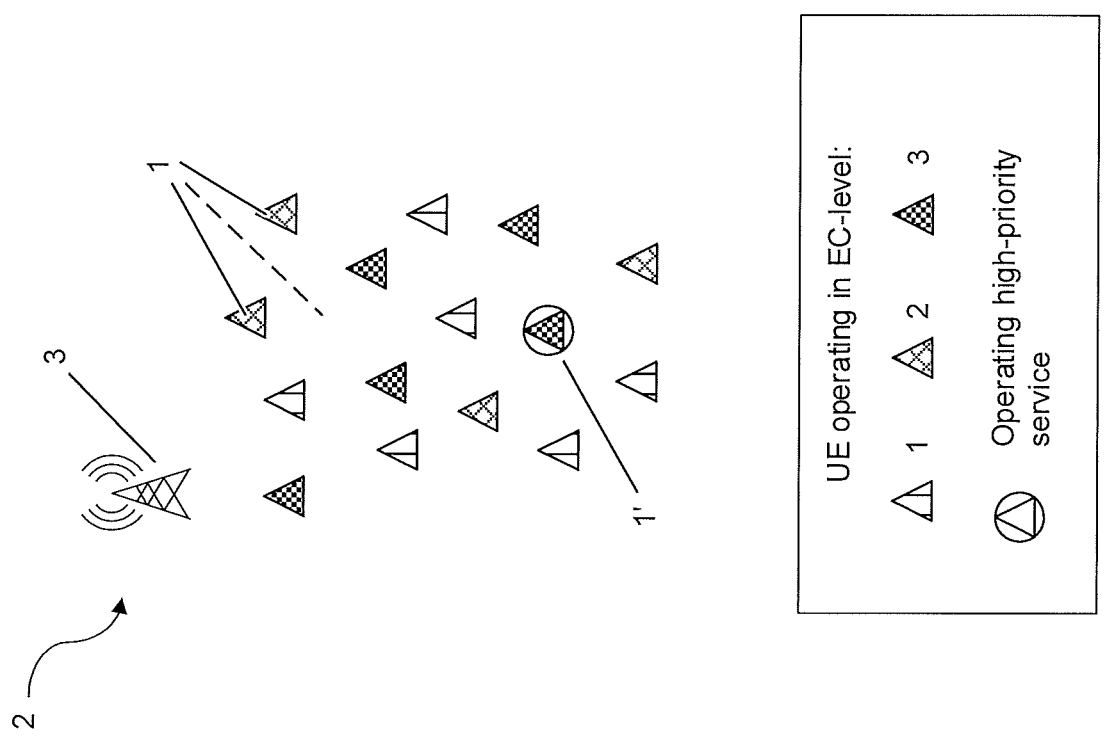

The impact of the inventive method on a couple of wireless devices 1 camping on one base node 3 is shown in FIGS. 2a and 2b.

FIG. 2a shows a couple of wireless devices 1 operating in the cell area of a base node 3 of a cellular network 2. The shown wireless devices 1 are each operating in enhanced coverage (EC). Each wireless device has assigned an enhanced coverage level (EC-level) between 1 and 3. The more estimated repetitions are needed, the higher the enhanced coverage level is. In FIG. 2a this is indicated through different hatching as explained in the caption.

Further one wireless device 1' is shown as operating in a high-priority service. This is for instance a home security panel operated for emergency calls, or a device e.g. for elderly people for calling ambulance etc.

FIG. 2a shows the situation, when the base node 3 is operating normally, that means in the SIBs no barring indication is broadcasted.

The same constellation of wireless devices in conjunction with its serving base node 3 is now shown in FIG. 2b. Only difference is now that the base node 3 broadcasts a barring indication with the M-SIBs. This affects a couple of wireless devices in the cell area which get barred. With the dashed sign as indicated in the caption the barred wireless devices are shown.

In case of a total barring indication all shown wireless devices would be barred.

In case of a barring of all enhanced coverage devices also all shown wireless devices would be barred.

In the shown situation however the barring indication only relates to wireless devices operating in EC-level 3. That means, the SIB indicates a barring indication for an intensive use level corresponding to EC-level 3. In response four of the shown wireless devices are now indicated as being barred. All of these wireless devices were depicted as being operated in EC-level 3.

However wireless device 1' is not barred although operating in EC-level 3. This wireless device is operating in a high-priority service, hence the barring indication is overruled for this wireless device due to the service it is operating.

It becomes apparent by this illustrative examples that present invention leads to a good trade-off between the base node's needs in order to cope with congestion situations and the operation of wireless devices with intensive use and possibly operating in a high-priority service. The inventive method takes into account also the priority of the service the wireless device is operating in and hence provides a better balanced approach than known methods.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for operating a wireless device in a cellular network, the wireless device operating with a base node of the cellular network, the method comprising:
   receiving a barring indication from the base node, the barring indication identifying a first intensive use level, of a plurality of intensive use levels, for barring, wherein the plurality of intensive use levels indicate an increasing intensity of use of available resources of the base node;
   determining whether the wireless device is operating in an intensive use mode based on usage by the wireless device of available resources of the base node being above a threshold amount;
   determining which of the plurality of intensive use levels is associated with the wireless device based on an amount of available resources of the base node being used by the wireless device;
   responsive to determining that the wireless device is operating in the intensive use mode, determining whether the wireless device is operating in a privileged service having a higher priority than a non-privileged service or is operating in the non-privileged service;
   responsive to determining that the wireless device is operating in the privileged service, continuing the operation of the wireless device with the base node regardless of the determined intensive use level associated with the wireless device;
   responsive to determining that the wireless device is operating in the non-privileged service and is associated with one of the plurality of intensive use levels associated with a lower intensity of use than indicated by the identified first intensive use level, continuing the operation of the wireless device with the base node; and
   responsive to determining that the wireless device is operating in the non-privileged service and is associated with one of the plurality of intensive use levels associated with an equal or higher intensity of use than indicated by the identified first intensive use level, suppressing the operation of the wireless device with the base node.

2. The method according to claim 1, wherein the intensive use mode comprises operating in enhanced coverage mode.

3. The method according to claim 1, wherein determining whether the wireless device is operating in the intensive use mode comprises: determining that the wireless device is operating at an intensive use level at least equal to the first intensive use level identified by the barring signal.

4. The method according to claim 3, wherein the increasing intensity of use of available resources of the base node relates to the necessary estimated repetitions in enhanced coverage mode.

5. The method according to claim 3, wherein the first intensive use level relates to a coverage enhancement level based on congestion associated with a coverage area.

6. The method according to claim 1, wherein the non-privileged service is a service within the cellular network which is not the privileged service.

7. The method according to claim 6, wherein the privileged service comprises execution of a communication session at least in a predetermined communication access class.

8. The method according to claim 7, wherein the communication access class comprises at least one of: —emergency communication, —alarm communication, —exceptional communication, or —delay critical communication.

9. The method according to claim 6, wherein the privileged service comprises at least one of: —operating in a predetermined cellular network tariff, or —relating to a privileged type of wireless device.

10. A wireless device operating with a base node of a cellular network, comprising:
    a communication unit configured to receive a barring indication from the base node, the barring indication identifying a first intensive use level, of a plurality of intensive use levels, for barring, wherein the plurality of intensive use levels indicate an increasing intensity of use of available resources of the base node; and
    a control processing unit configured to:
    determine whether the wireless device is operating in an intensive use mode based on usage by the wireless device of available resources of the base node being above a threshold amount,
    determine which of the plurality of intensive use levels is associated with the wireless device based on an amount of available resources of the base node being used by the wireless device,
    determine, responsive to determining that the wireless device is operating in the intensive use mode, whether the wireless device is operating in a privileged service having a higher priority than a non-privileged service or is operating in the non-privileged service; wherein the communication unit is further configured to:
    continue, responsive to determining that the wireless device is operating in the privileged service, the operation of the wireless device with the base node regardless of the determined intensive use level associated with the wireless device,
    continue, responsive to determining that the wireless device is operating in the non-privileged service and is associated with one of the plurality of intensive use levels associated with a lower intensity of use than indicated by the identified first intensive use level, the operation of the wireless device with the base node, and
    suppress, responsive to determining that the wireless device is operating in the non-privileged service and is associated with one of the plurality of intensive use levels associated with an equal or higher intensity of use than indicated by the identified first intensive use level, the operation of the wireless device with the base node.

11. A wireless device according to claim 10, wherein the intensive use mode comprises operating in enhanced coverage mode.

12. A wireless device according to claim 10, wherein the control processing unit is further configured to determine that the wireless device is operating at an intensive use level at least equal to the first intensive use level identified by the barring signal.

13. A wireless device according to claim 10, wherein the non-privileged service is a service within the cellular network which is not the privileged service.

14. A wireless device according claim 13, wherein the privileged service comprises execution of a communication session at least in a predetermined communication access class, and the communication access class comprises at least one of: —emergency communication, —alarm communication, —exceptional communication, or —delay critical communication.

15. A cellular network for wireless communication, comprising:
- a base node; and
- one or more wireless devices operating with the base node,
- wherein the base node is configured to transmit, to the one or more wireless devices, a barring indication identifying a first intensive use level, of a plurality of intensive use levels, for barring, wherein the plurality of intensive use levels indicate an increasing intensity of use of available resources of the base node,
- wherein each respective wireless device of the one or more wireless devices is configured to:
  - receive the barring indication,
  - determine whether the respective wireless device is operating in an intensive use mode based on usage by the respective wireless device of available resources of the base node being above a threshold amount,
  - determine which of the plurality of intensive use levels is associated with the respective wireless device based on an amount of available resources of the base node being used by the respective wireless device,
  - determine, responsive to determining that the respective wireless device is operating in the intensive use mode, whether the respective wireless device is operating in a privileged service having a higher priority than a non-privileged service or is operating in the non-privileged service,
  - continue, responsive to determining that the respective wireless device is operating in the privileged service, the operation of the respective wireless device with the base node regardless of the determined intensive use level associated with the respective wireless device,
  - continue, responsive to determining that the respective wireless device is operating in the non-privileged service and is associated with one of the plurality of intensive use levels associated with a lower intensity of use than indicated by the identified first intensive use level, the operation of the respective wireless device with the base node, and
  - suppress, responsive to determining that the respective wireless device is operating in the non-privileged service and is associated with one of the plurality of intensive use levels associated with an equal or higher intensity of use than indicated by the identified first intensive use level, the operation of the respective wireless device with the base node.

16. The cellular network according to claim 15, wherein each respective wireless device is configured to determine whether the respective wireless device is operating in the intensive use mode by determining that the respective wireless device is operating at an intensive use level at least equal to the first intensive use level identified by the barring signal.

17. The cellular network according to claim 16, wherein the increasing intensity of use of available resources of the base node relates to the necessary estimated repetitions in enhanced coverage mode.

18. The cellular network according to claim 16, wherein the first intensive use level relates to a coverage enhancement level based on congestion associated with a coverage area.

19. The cellular network according to claim 16, wherein the non-privileged service is a service within the cellular network which is not the privileged service.

20. The cellular network according to claim 15, wherein the intensive use mode comprises operating in enhanced coverage mode.

* * * * *